(12) United States Patent
Hall et al.

(10) Patent No.: US 11,763,804 B2
(45) Date of Patent: Sep. 19, 2023

(54) LEVERAGING DIALOGUE HISTORY IN UPDATED DIALOGUE

(71) Applicant: Microsoft Technology Licensing, LLC, Redmond, WA (US)

(72) Inventors: David Leo Wright Hall, Berkeley, CA (US); Pengyu Chen, Union City, CA (US); Jason Andrew Wolfe, Berkeley, CA (US); Jayant Sivarama Krishnamurthy, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 262 days.

(21) Appl. No.: 16/915,875

(22) Filed: Jun. 29, 2020

(65) Prior Publication Data

US 2021/0406718 A1    Dec. 30, 2021

(51) Int. Cl.
*G10L 15/18* (2013.01)
*G06N 20/00* (2019.01)
(Continued)

(52) U.S. Cl.
CPC ............ *G10L 15/18* (2013.01); *G06F 40/237* (2020.01); *G06F 40/35* (2020.01); *G06N 5/04* (2013.01); *G06N 20/00* (2019.01)

(58) Field of Classification Search
None
See application file for complete search history.

(56) References Cited

U.S. PATENT DOCUMENTS

| 11,086,858 B1* | 8/2021 | Koukoumidis ...... G06F 16/2365 |
| 2004/0225499 A1* | 11/2004 | Wang ...................... G10L 15/26 |
| | | 704/E15.044 |

(Continued)

FOREIGN PATENT DOCUMENTS

EP    3486842 A1    5/2019

OTHER PUBLICATIONS

Jurafsky, et al., "Speech and Language Processing—An Introduction to Natural Language Processing, Computational Linguistics, and Speech Recognition—Third Edition Draft", Retrieved from: https://web.archive.org/web/20191213152318if_/https://web.stanford.edu/~jurafsky/slp3/edbook_oct162019.pdf, Oct. 16, 2019, 621 Pages.

(Continued)

*Primary Examiner* — Shaun Roberts
(74) *Attorney, Agent, or Firm* — Alleman Hall Creasman & Tuttle LLP

(57) ABSTRACT

A method of leveraging a dialogue history of a conversational computing interface to execute an updated dialogue plan. The method comprises maintaining an annotated dialogue history of the conversational computing interface. The annotated dialogue history includes a plurality of traced steps defining a data-flow including input data used to execute a context-dependent operation and output data recorded from a previous execution of the context-dependent operation. The method further comprises recognizing an updated dialogue plan including a prefix of executable steps and an updated executable step following the prefix. The method further comprises automatically computer-recognizing that the prefix of executable steps of the updated dialogue plan matches a corresponding prefix of traced steps in the annotated dialogue history. The method further comprises re-using the data-flow from the prefix of traced steps in the annotated dialogue history to automatically determine input data of the updated executable step.

20 Claims, 6 Drawing Sheets

(51) Int. Cl.
*G06F 40/237* (2020.01)
*G06N 5/04* (2023.01)
*G06F 40/35* (2020.01)

(56) References Cited

U.S. PATENT DOCUMENTS

| | | | |
|---|---|---|---|
| 2014/0317030 A1* | 10/2014 | Shen | G06N 3/006 |
| | | | 706/46 |
| 2017/0293681 A1 | 10/2017 | Blandin et al. | |
| 2017/0293834 A1* | 10/2017 | Raison | G06F 40/40 |
| 2019/0042988 A1* | 2/2019 | Brown | G06N 5/022 |
| 2019/0103103 A1* | 4/2019 | Ni | G06F 3/167 |
| 2019/0206400 A1* | 7/2019 | Cui | G05D 1/0016 |
| 2019/0311036 A1* | 10/2019 | Shanmugam | H04L 51/02 |
| 2020/0097544 A1* | 3/2020 | Alexander | G06N 3/084 |
| 2021/0065705 A1* | 3/2021 | Ham | G10L 15/1815 |
| 2021/0097140 A1* | 4/2021 | Chatterjee | G06N 5/022 |

OTHER PUBLICATIONS

"International Search Report and Written Opinion Issued in PCT Application No. PCT/US21/034667", dated Sep. 13, 2021, 12 Pages.

Application Filed in U.S. Appl. No. 62/883,034, filed Aug. 5, 2019, 63 Pages.

* cited by examiner

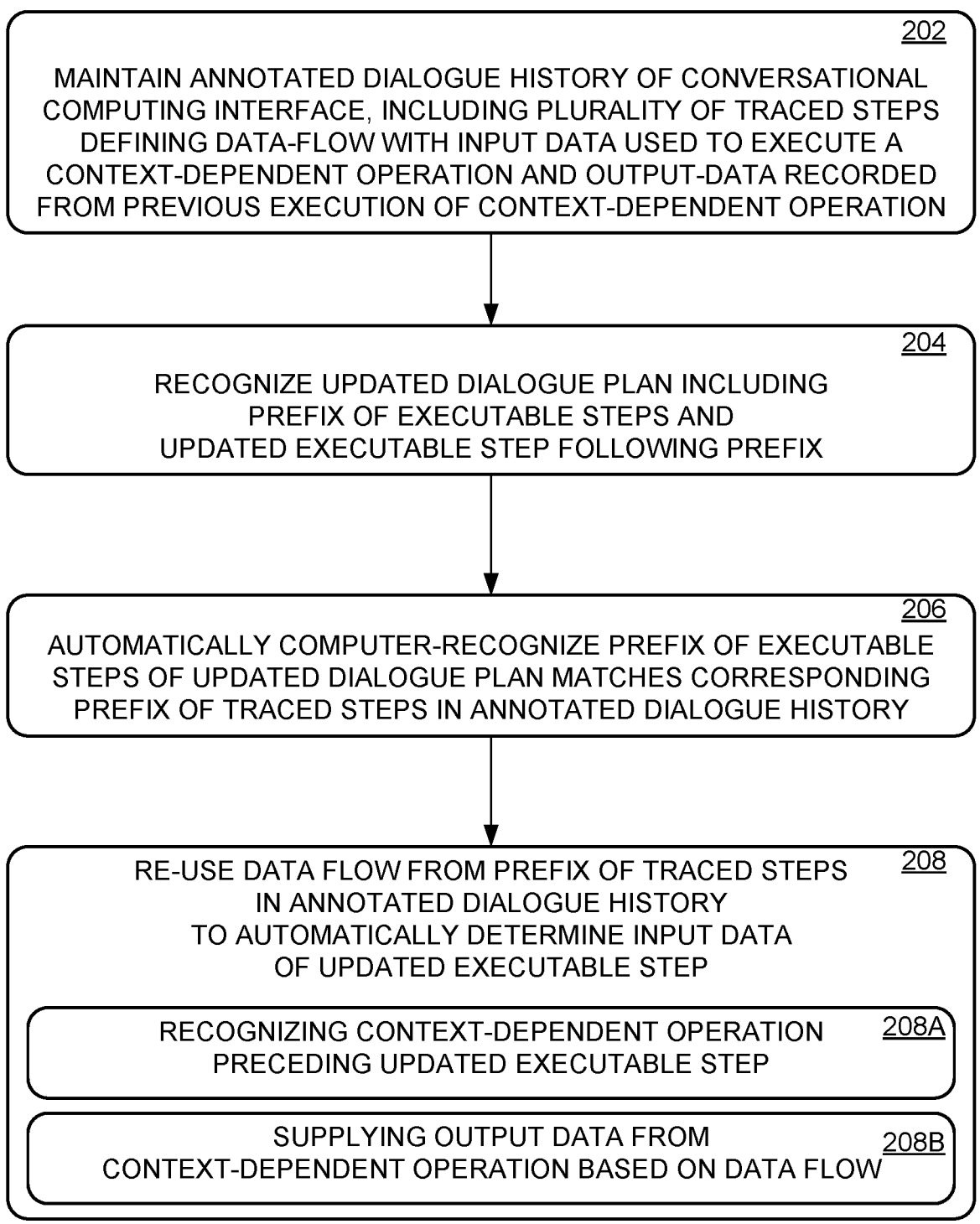

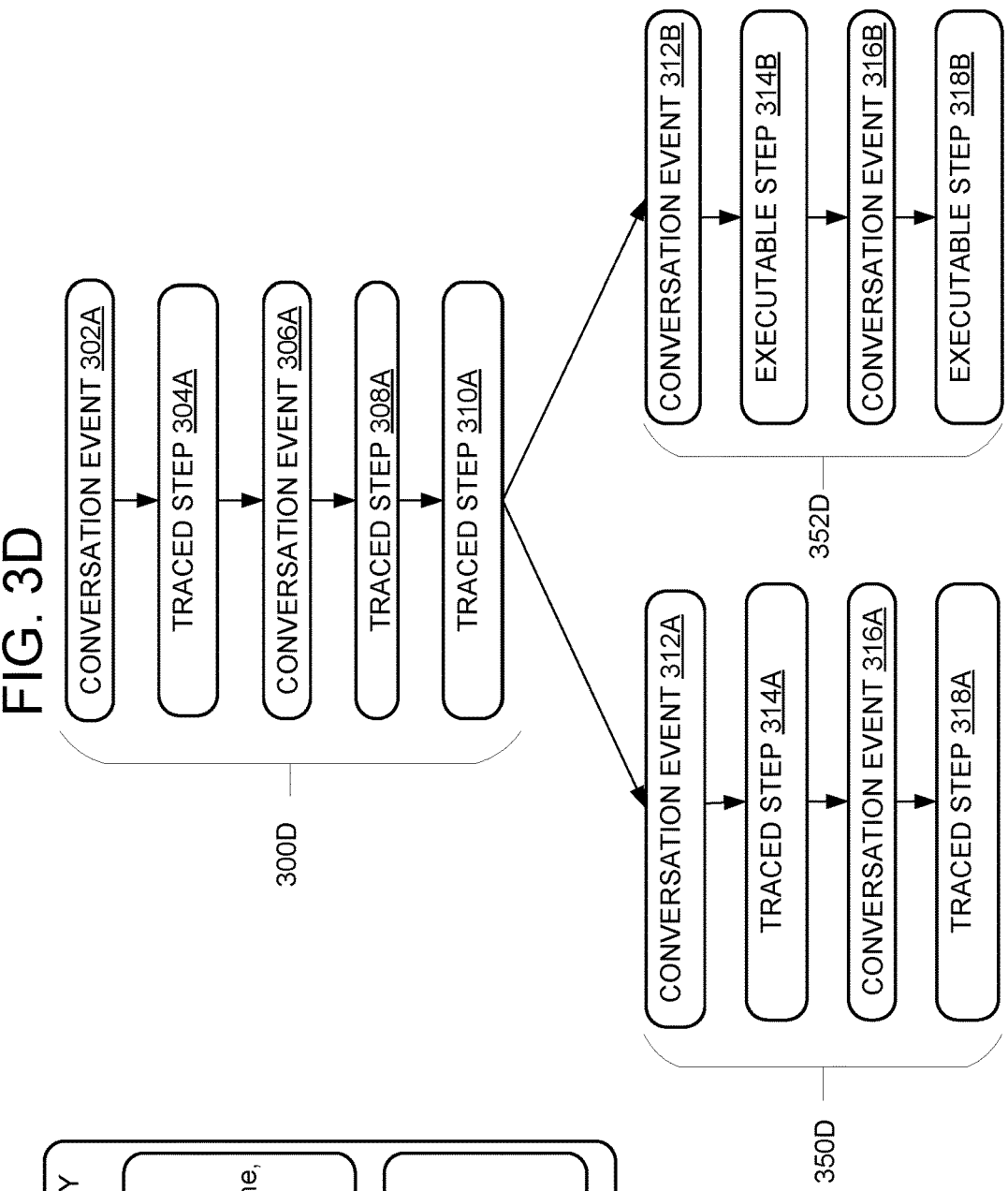
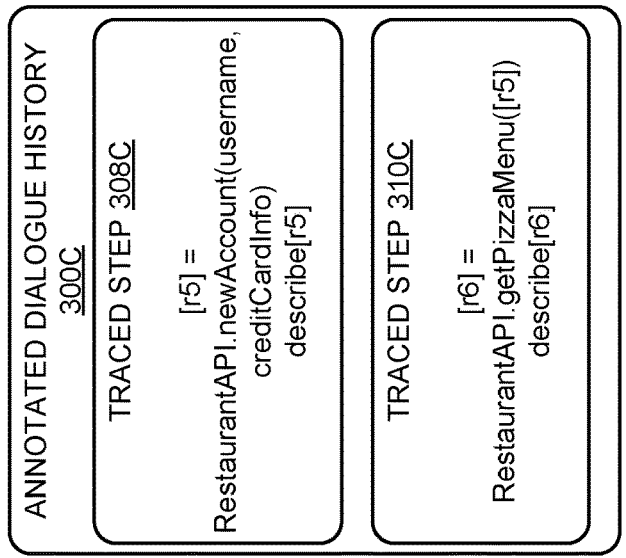

LEVERAGING DIALOGUE HISTORY IN UPDATED DIALOGUE

BACKGROUND

Conversational computing interfaces may utilize a dialogue history of previous conversations, for example for training or for responding to future requests. However, a dialogue history may not be directly executable, as previous actions by the conversational computing interface may not be possible or appropriate to repeat in a new context.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of leveraging a dialogue history of a conversational computing interface to execute an updated dialogue plan comprises maintaining an annotated dialogue history of the conversational computing interface. The annotated dialogue history includes a plurality of traced steps defining a data-flow including input data used to execute a context-dependent operation and output data recorded from a previous execution of the context-dependent operation. The method further comprises recognizing an updated dialogue plan including a prefix of executable steps and an updated executable step following the prefix. The method further comprises automatically computer-recognizing that the prefix of executable steps of the updated dialogue plan matches a corresponding prefix of traced steps in the annotated dialogue history. The method further comprises re-using the data-flow from the prefix of traced steps in the annotated dialogue history to automatically determine input data of the updated executable step, including recognizing the context-dependent operation preceding the updated executable step, and supplying output data from the context-dependent operation based on the data-flow.

BRIEF DESCRIPTION OF THE DRAWINGS

FIG. 2 shows a method of leveraging a dialogue history of a conversational computing interface to execute an executed dialogue plan.

FIGS. 3A-3C show an annotated dialogue history and a corresponding updated dialogue plan.

FIG. 3D shows an exemplary data structure for annotated dialogues.

DETAILED DESCRIPTION

Figure 1B:
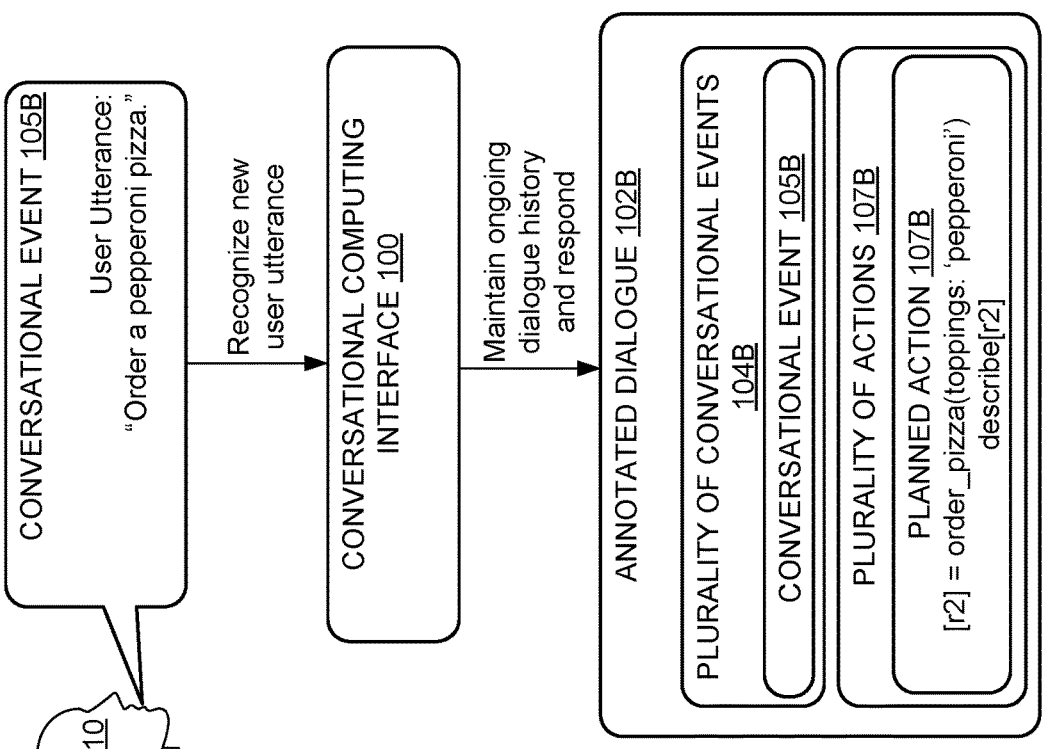
FIGS. 1B-1D show exemplary conversations between a user and conversational computing interface.

Conversational computing interfaces enable human users to interact with computers in a more natural manner. Conversational computing interfaces may be configured to conduct spoken and/or textual conversations with a human user, e.g., in order to fulfill requests by the human user, answer queries, control software and/or hardware systems, and/or for any other suitable purpose.

A properly trained conversational computing interface is able to process natural user interactions such as spoken user utterances or written user commands, without requiring the user to use a particular syntax defined by the computer. This allows the human user to use natural language when addressing the computer. For example, the user may interact using natural language by asking the computer to answer a question or by giving the computer a command. In response, the conversational computing interface is trained to automatically perform actions, such as answering questions or otherwise assisting the user (e.g., ordering a pizza for the user in response to the user saying or typing "Order a cheese pizza," and/or reporting today's weather forecast in response to the user saying or typing "What is the weather like").

Conversational computing interfaces may be configured to respond to any suitable conversation event(s) that may be detected by a computer with any suitable input devices/sensors. Non-limiting examples of conversation events include user utterances in the form of speech and/or text, button presses, network communication events (e.g., receiving a result of an application programming interface (API) call), gesture inputs, etc. More generally, conversation events include any occurrences that may be relevant to user interaction and that are detectable by a conversational computing interface, for example via input/output hardware (e.g., microphones, cameras, keyboards, touchscreens), communication hardware, and the like.

Conversational computing interfaces may be configured to perform any suitable actions to assist a user. Non-limiting examples of actions include performing computations, controlling other computers and/or hardware devices (e.g., by invoking an API), communicating over networks (e.g., to invoke an API), receiving user input (e.g., in the form of any detectable event), and/or providing output (e.g., in the form of text or speech). More generally, actions may include any behaviors that a computer system is configured to perform. Other non-limiting examples of actions include controlling electronic devices (e.g., turning on/off lights in a user's home, adjusting a thermostat, playing multimedia content via display/speakers), interacting with commercial and/or other services (e.g., invoking an API to schedule a ride via a ride-hailing service, ordering food/packages via a delivery service), and/or interacting with other computer systems (e.g., to access information from a website or database, send an email, access a user's schedule in a calendar program).

Accordingly, by recognizing various events and in response, performing relevant actions, conversational computing interfaces enable users to use conversation, gesture, and other modes of expression to control a computer to perform any suitable tasks. Conversational computing interfaces may be configured to recognize various events, and to perform various actions in response to events by generating a computer-executable plan. "Plan" is used herein to refer to any suitable representation of steps that may be taken by a computer in order to perform an action (e.g., computer-executable code, such as computer-executable bytecode in a data-flow programming language).

In some examples, conversational computing interfaces may be trained based on annotated dialogues. FIG. 1A shows an exemplary scenario wherein a conversational computing interface 100 is trained on an annotated dialogue 102A. "Annotated dialogue" is used herein to refer to any suitable representation of an exemplary conversation between a human and a conversational computing interface (e.g., a dialogue), including any suitable annotations indicating actions that were taken by the conversational computing interface in response to events in the conversation. Generally speaking, annotations may include anything that is associated with an event (e.g., an utterance or other input from a human user participating in a dialogue), including but not limited to plans, results, computational traces, and/or any suitable metadata (e.g., metadata indicating descriptions of a context in which the dialogue takes place, or metadata indicating user satisfaction with a plan). For example, annotated dialogue 102A includes a plurality of conversational events 104A and a plurality of conversational computing interface actions 106A. Actions and/or results of actions taken by a conversational computing interface may be tracked at any suitable level of granularity, e.g., as a computational trace indicating high-level action commands that were executed and/or low-level return values of computational steps performed during the execution of such high-level action commands. An annotated dialogue may indicate desired behavior for a conversational computing interface, for example by including possible conversation events that could occur in a conversation, along with an indication of actions that should be taken in order to respond to the events. For example, the annotated dialogue 102A may indicate that for a conversational event 105A in which a user says "order a cheese pizza," a suitable response includes traced action 107A indicating the details of a previous and/or exemplary executed action. For example, traced action 107A may include a computational trace indicating a high-level command to "order_pizza(toppings: cheese)." Although not shown in FIG. 1A, the actions may further include low-level data pertaining to an API call configured to order a cheese pizza via a restaurant-delivery API, and further computer operations to describe the resulting pizza order and confirm that the user wishes to place the order.

As a result of training on annotated dialogues, conversational computing interface 100 may be configured to respond to an event that occurs in a conversation with an appropriate action. For example, conversational computing interface 100 may be trained to reproduce an action that was taken in response to the event in an annotated dialogue, e.g., to carry out the computational steps indicated in traced action 106A responsive to recognizing any conversational event in which a user asks to order a cheese pizza.

As another example, conversational computing interface 100 may be trained to generate an action specifically for responding to the event, where the action was not necessarily indicated in any annotated dialogue. For example, the conversational computing interface may be trained to generate an action that is similar to an action that was taken for some other event in an annotated dialogue.

Figure 1A:
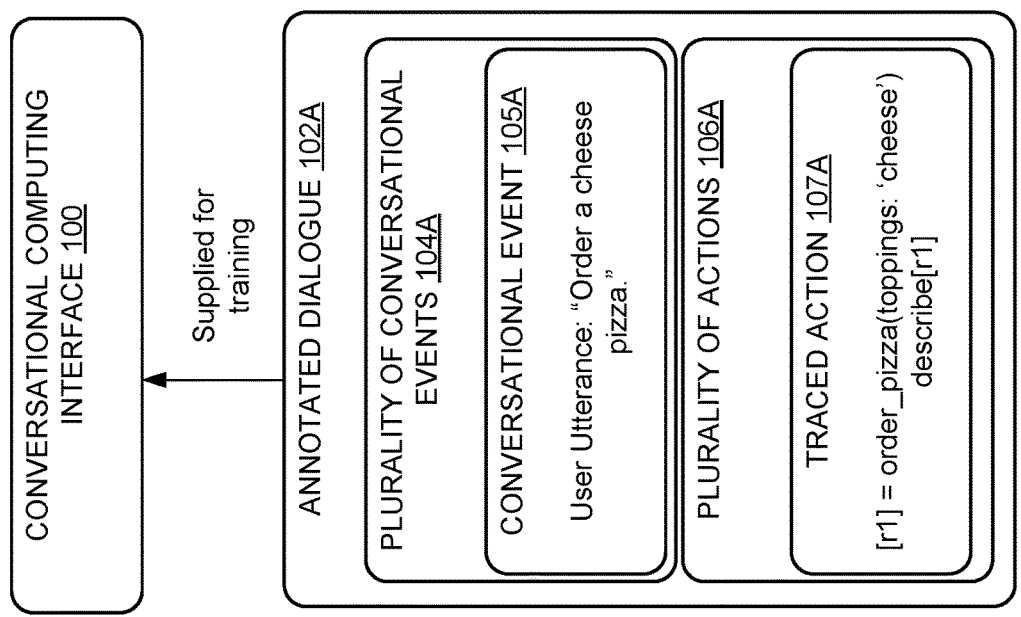
FIG. 1A shows an annotated dialogue for training a conversational computing interface.

For example, as shown in FIG. 1B, based on the training on conversational event 104A and traced action 106A, conversational computing interface 100 may be configured to respond to a new conversation event 105B in which a user 110 asks to "order a pepperoni pizza," by generating a new planned action 106B including computational steps suitable for ordering a pepperoni pizza, via the restaurant-delivery API, describing the resulting order, and confirming that the user wishes to place the order. As shown in FIG. 1B, conversational computing interface 100 is further configured to maintain an ongoing dialogue including the conversational event 105B and new planned action 107B. For example, conversational computing interface 100 may save the conversational event 105B and the new planned action 107B in an annotated dialogue 102B indicating an updated dialogue plan, which similarly to annotated dialogue 102A may include a plurality of other conversational events 104B and/or a plurality of other traced actions 106B.

Furthermore, beyond the use of annotated dialogues for training, annotated dialogue history 102A may be used to provide context to interactions between the user 110 and the conversational computing interface 100, for example, to keep track of which previous actions were taken and results of such previous actions. For example, the conversational computing interface may be configured to maintain annotated dialogue history 102B indicating previous conversational events and/or actions within a conversation with a particular user and/or within a series of recent conversations with the particular user. The conversational computing interface may be configured to maintain an ongoing record of the conversation in an annotated dialogue history and to update the ongoing record with new conversational events (e.g., as such events are detected or received), actions, and results (e.g., with a computational trace of actions taken by the conversational computing interface and low-level data pertaining to the execution of such actions).

In some examples, the ongoing dialogue history may include all of the previous events from annotated dialogue 102A. in other examples, a new conversational event may be stored into a separate dialogue history. For example, conversational computing interface 100 may maintain different separate histories for different conversations, for conversations taking place on different days, for conversations with regard to different topics, and/or for conversations involving different users.

In some examples, a conversational computing interface may be configured to take an action based at least in part on a previous action in the annotated dialogue history. In some examples, the conversational computing interface may be configured to repeat an action (e.g., responsive to a user request that a previous action be repeated). For example, user 110 may ask for the conversational computing interface to "order a pepperoni pizza" as in conversational event 105B and accordingly the conversational computing interface may perform suitable computational actions to order the pizza (e.g., using a restaurant delivery service API) as in planned action 107B. Although not shown in FIG. 1A, the conversational computing interface may be configured to report a cost for the pizza delivery and confirm with the user 110 that the pizza should be ordered, placing the order responsive to the user 110 providing such confirmation (e.g., in a subsequent conversation event such as an affirmative user utterance or gesture).

Figure 1C:
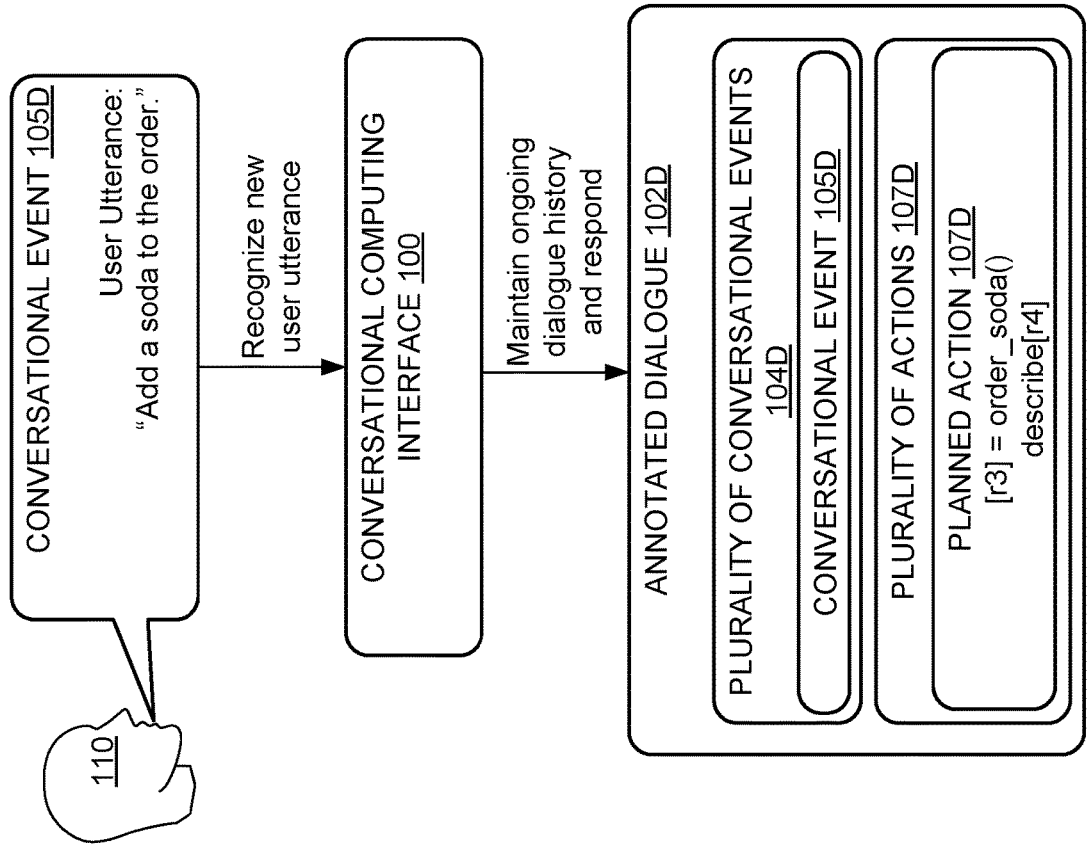
Figure 1D:
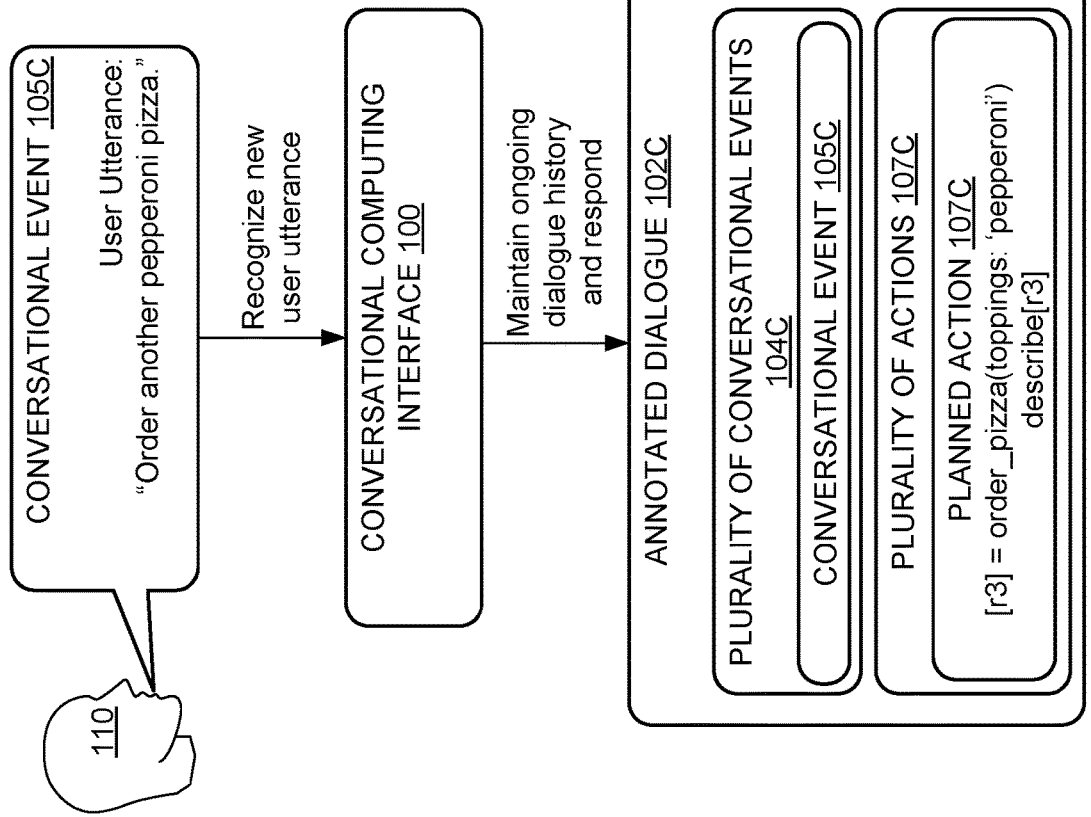

As shown in FIG. 1C, in a new conversational event 105C, the user 110 may request that the conversational computing interface 100 "order another pepperoni pizza." Accordingly, the conversational computing interface 100 may be configured to repeat the previously-executed action 106B in a replicated planned action 107B, e.g., so as to order another pepperoni pizza. FIG. 1D shows another example of updating an annotated dialogue history to include new features. Following along with the example wherein a user asks to order another pizza, the user may also ask in conversational event 105D to "add a soda to the order," and accordingly, the annotated dialogue history may be updated to include the new user utterance indicated in conversational event 105D and a new planned action 107D configured to update the order to include a soda.

In other examples, the conversational computing interface may be configured to repeat a previous action with a modification. For example, responsive to a user request to "order another pizza, but this time make it cheese instead of pepperoni," the conversational computing interface may be configured to perform substantially the same computational actions as before (e.g., invoking the restaurant delivery service API), but with suitable modifications to satisfy the user's updated request (e.g., with suitable parameters to order a cheese pizza). In still further examples, a conversational event may indicate that information pertaining to a previous action should be utilized, although such previous action may not be appropriate to repeat. For example, if the user asks "how much did the pepperoni pizza cost?" the computational computing interface may be configured to search, within the annotated dialogue history, for an action (e.g., invoking the restaurant-delivery API) with an associated output data value that may be used to satisfy the user's request (e.g., a cost value returned by the restaurant-delivery API action). Although the previously-computed data value may be available within the annotated dialogue history, it may not be appropriate to actually repeat a computational action which resulted in such data value (e.g., it would not be appropriate to order an additional pizza responsive to the user asking how much the pizza cost).

Annotated dialogues may be collected in any suitable manner, e.g., from historical data, generated by simulation, and/or obtained from human annotators. Collected annotated dialogue histories may be used for re-training the conversational computing interface (e.g., to update the conversational computing interface behavior based on a reported measure of user satisfaction during or after the dialogue). However, obtaining annotated dialogues may present a considerable expense (e.g., due to requisite human oversight of the training data).

In some examples, an annotated dialogue history may be updated to include new features (e.g., to include new computational actions and/or to re-parametrize previously-executed computational actions). However, when such new features are added, the detailed record of executed actions in the annotated dialogue history may no longer correspond to the new features. As such, the annotated dialogue history may need to be re-annotated or otherwise updated to match the new features. For example, if training data is updated from one system version to another, an annotated dialogue history of the training data may need to be updated to include new versions of available computational actions (e.g., to utilize an updated version of a restaurant-delivery API). However, there may not be any guarantee that the results (e.g., computational trace) in the annotated dialogue history still correspond to the updated features. For example, an updated version of a restaurant-delivery API may return different data (e.g., the function invoked for ordering a pizza may no longer return an associated price, which may instead be obtained by a "price query" function of the updated restaurant-delivery API).

The present disclosure is directed to leveraging a previously-conducted conversation history in an updated conversation. The techniques disclosed herein may be used to generate an updated annotated dialogue history, by re-using data-flow of a previous annotated dialogue history for an updated dialogue plan. Data-flow includes any input/output values, as well as computational operations, that are involved in the execution of a dialogue plan. Data-flow for one or more steps of a dialogue plan may take the form of a computational trace. For example, the computational trace may indicate low-level input and/or output values, function names, and/or executable code associated with each step performed by the conversational computing interface. A portion of a computational trace indicating the data-flow for a particular step of the dialogue plan may be referred to as a traced step.

Leveraging previously-conducted conversation histories by re-using data-flow as described herein may present numerous technical benefits, for example in the context of training and/or deploying a conversational computing interface. The techniques described herein may be utilized to expand the training data available to a machine learning system (e.g., by adapting previously-conducted conversation histories to new system versions, and/or by creating training data based on editing previously-conducted conversation histories to produce new exemplary dialogues). Such generation of training data may reduce costs associated with training the machine learning system, e.g., by reducing the amount of annotations and/or oversight provided by humans. Furthermore, the techniques described herein may be utilized when deploying a trained machine learning system to enable the system to more efficiently respond to conversational events. For example, as described herein, a conversational computing interface may be configured to incrementally process conversational events as a conversation occurs, including predicting a response action that is likely applicable to a conversation event and partially executing data-flow of the response action during the conversation. By predicting and executing data-flow while the user is still engaging in conversation, the conversational computing interface may be able to finish executing the response action more quickly, relative to a system that waits for the user to finish the conversation first. Furthermore, the techniques described herein may allow re-executing portions of data-flow to correct the conversational computing interface behavior in the event of a mis-prediction, thereby resulting in higher user satisfaction as the conversational computing interface is able to quickly respond to conversational events based on predictions while nevertheless accounting for mistakes that could occur due to mis-predictions.

In some examples, an executable operation in an annotated dialogue history may be a context-dependent operation configured to be executed within a particular operational context, e.g., an operation that should be executed only when sufficient resources are available, only with sufficient permission from the user, only within a defined time-frame, and/or in any other suitably limited context. The updated dialogue plan may be efficiently executed while re-using previous data-flow when relevant, without repeating any context-dependent operations that would be inappropriate to repeat in the new context of the updated dialogue plan.

In some examples, execution of an updated dialogue plan may enable the generation of new annotated dialogue history training data, based on incorporating a new conversational computing interface feature into a new updated dialogue plan based on the previous annotated dialogue history. For example, the previous annotated dialogue history may be automatically updated to a new system version, and accordingly, the updated annotated dialogue history may be used as training data for the new system version. The method disclosed herein may enable the re-use of previous user utterances and/or computational traces for re-training, even when the conversational computing interface is updated to a new system version that generates one or more different response actions with regard to a user utterance, and/or that utilizes a different implementation of one or more response actions.

In some examples, the method described herein may be used to efficiently respond to user queries, for example, by re-executing portions of data-flow of a previous annotated dialogue history when such data-flow pertains to a new query. For example, if a user asks for a follow-up action or information report pertaining to a previously-executed action, the data-flow of the previous annotated dialogue history may be re-used to suitably follow-up on the previous action, without necessarily re-executing every step of the previous action.

In some examples, the context-dependent operation includes a computer operation having a computational expense exceeding a predefined threshold. For example, a conversational computing interface may support searching for a suitable time to schedule a meeting based on a set of constraints defined by a plurality of different user schedules. However, solving a constraint problem to find a suitable time may incur a large computational expense. Accordingly, searching for a meeting time may be considered a context-dependent operation.

In some examples, a context-dependent operation is a computer operation that causes any one of a pre-defined plurality of non-repeatable side effects. For example, a non-repeatable side-effect may include incurring a financial or other cost (e.g., incurring a large network latency and/or throughput, and/or incurring a large electric power cost). As another example, a non-repeatable side-effect may include performing an action that writes data to a disk or outputs data via a network (e.g., saving a new file or over-writing a file, sending an email, and/or scheduling a meeting). As another example, a non-repeatable side-effect may include receiving input data and/or performing a measurement which may not be generally available, e.g., obtaining a time-dependent result from an information API.

As such, even though the context-dependent operation may have been executed and traced in the annotated dialogue history, it may not generally be suitable and/or possible to repeat the context-dependent operation. As another example, a context-dependent operation may include an API call to an API that was initially supported but has since been deprecated. For example, a conversational computing interface may be initially configured to order food deliveries via a first restaurant delivery service API, and an annotated dialogue history may include one or more traced steps in which the first restaurant delivery service API is invoked, as well as further traced steps pertaining to helping a user to make an order, confirming the order, and/or describing the completed order to the user. Subsequently, use of the first restaurant-delivery service API may no longer be supported (e.g., because of a change to the API rendering it incompatible with the computational computing interface, or due to a corresponding real-world business ceasing delivery services). Accordingly, the computational computing interface may be reconfigured in a subsequent system version to use a second, different restaurant delivery service API. As such, a traced step that invoked the first restaurant delivery API may no longer be repeatable. Nevertheless, using the techniques of the present disclosure, the annotated dialogue history may still be leveraged for training, e.g., so as to train the conversational interface with regard to the further traced steps in the annotated dialogue history pertaining to helping the user make the order, confirming the order, and/or describing the completed order.

As another example, a context-dependent operation may include a computer operation that depends on input data that is variably unobtainable depending on context. For example, the restaurant-delivery service API may support a "Sunday specials" function configured to return a list of special offers provided by restaurants only on Sunday. If a user orders "the cheapest pizza on the Sunday specials menu" from a pizza restaurant on a Sunday, then the conversational computing interface may be configured to invoke the restaurant-delivery service API to determine the list of Sunday specials and select a least expensive option. However, if the user tries to order "the cheapest pizza on the Sunday specials menu" again on a Monday, the restaurant-delivery service API may be unable to return a suitable list of specials, as the Sunday specials menu is only available on Sunday.

As another non-limiting example of variably unobtainable data, a conversational computing interface may have a weather report function configured to output speech audio describing a predicted and/or measured temperature and rainfall at a specified time. However, the weather report function may be configured to obtain input data including the current temperature and rainfall from a weather service API that is only configured to return a weather report for a time specified within the same day or the next day, e.g., the weather service API may not support returning weather reports from previous days. As such, if the user asks for the "rainfall on Jun. 13, 2020" as of the date Jun. 13, 2020, the conversational computing interface may invoke the weather service API to get the predicted 4 PM rainfall for that day. However, it may not be possible to repeat this exact action on a subsequent date. If the API were invoked to request a report of the "4 PM rainfall on Jun. 11, 2020" as of the date Jun. 12, 2020, the requested information may no longer be available as the weather service API does not provide weather report for past dates.

In some examples, actions such as outputting a description (e.g., via speech audio or text) may or may not be considered context-dependent (e.g., outputting a description via speech audio may not be appropriate in a context in which the user wishes for the conversational computing interface to remain silent).

Some actions of a conversational computing interface may be generally considered context independent and/or repeatable. For example, a computer operation may be considered context-independent if it does not produce irreversible side effects. As a non-limiting example, an arithmetic or other computation that does not write data to persistent storage, invoke APIs, etc., may be considered context independent.

Operations may be defined as context-dependent or context-independent in any suitable manner, e.g., by maintaining an approved list of context-independent operations, maintaining a denied list of context-dependent operations, automatically determining context (in)-dependence of an operation based on executable code associated with the operation, automatically recognizing context (in)-dependence of an operation based on operating a trained machine learning (ML) and/or artificial intelligence (AI) model, or in any other suitable manner. For example, the conversational computing interface may be configured to automatically determine whether executable code associated with an operation produces any non-repeatable side effects by conducting an automated analysis prior to execution of the executable code, e.g., recursively determining if each function in the executable code is in a denied list of context-dependent operations and/or includes any sub-functions that are in the denied list of context-dependent operations.

The above-described examples of context-dependent operations are non-limiting. Context-dependent operations may include any other operations that are not suitable to execute outside of a particular associated context, due to any of infeasibility, expense, potentially undesirable and/or irreversible side-effects, and/or potential inconsistency with user intent. In the present disclosure, if an operation is not indicated to be context-dependent within a particular example, that operation may be assumed to be context-independent. Nevertheless, the examples presented herein are non-limiting. For example, an operation described as context-dependent with regard to the examples presented herein may be considered context-independent in other examples (and vice versa). As a specific example, in some implementations, updating a user's order (e.g., restaurant-delivery service API order or online merchant shopping cart) may be considered a context-independent operation, as long as said order is not finalized (e.g., as long as the user is not charged for a purchase). In other implementations, updating a user's order may be considered a context-dependent operation (e.g., because updating a user's shopping cart requires mutating data of the shopping cart, which may be irreversible, costly, and/or otherwise considered context-dependent). In some examples, the context-dependence or context-independence of conversational computing interface operations may be programmer-defined (e.g., defined for each possible primitive operation and/or API call supported by the conversational computing interface), user-defined (e.g., defined in a user configuration file), or otherwise delineated in any suitable fashion.

FIG. 2 shows a method 200 of leveraging a previously-conducted conversation history in an updated conversation (e.g., for generating training data, conducting an ongoing conversation, or any other suitable purpose). Method 200 may be performed by any suitable computer system, e.g., conversational computing interface 100 of FIG. 1A-1D, and/or computing system 400 of FIG. 4. Method 200 is configured to re-use the data-flow of the previously-conducted conversation history, including repeating previous context-independent operations, but without repeating previous context-dependent operations. By leveraging the annotated dialogue history for an updated dialogue plan that avoids potentially undesirable repetition of context-dependent operations, method 200 may be able to more efficiently generate training data and/or conduct an ongoing conversation, for example, as compared to executing a new dialogue plan without leveraging previously-conducted conversation history.

Figure 3A:
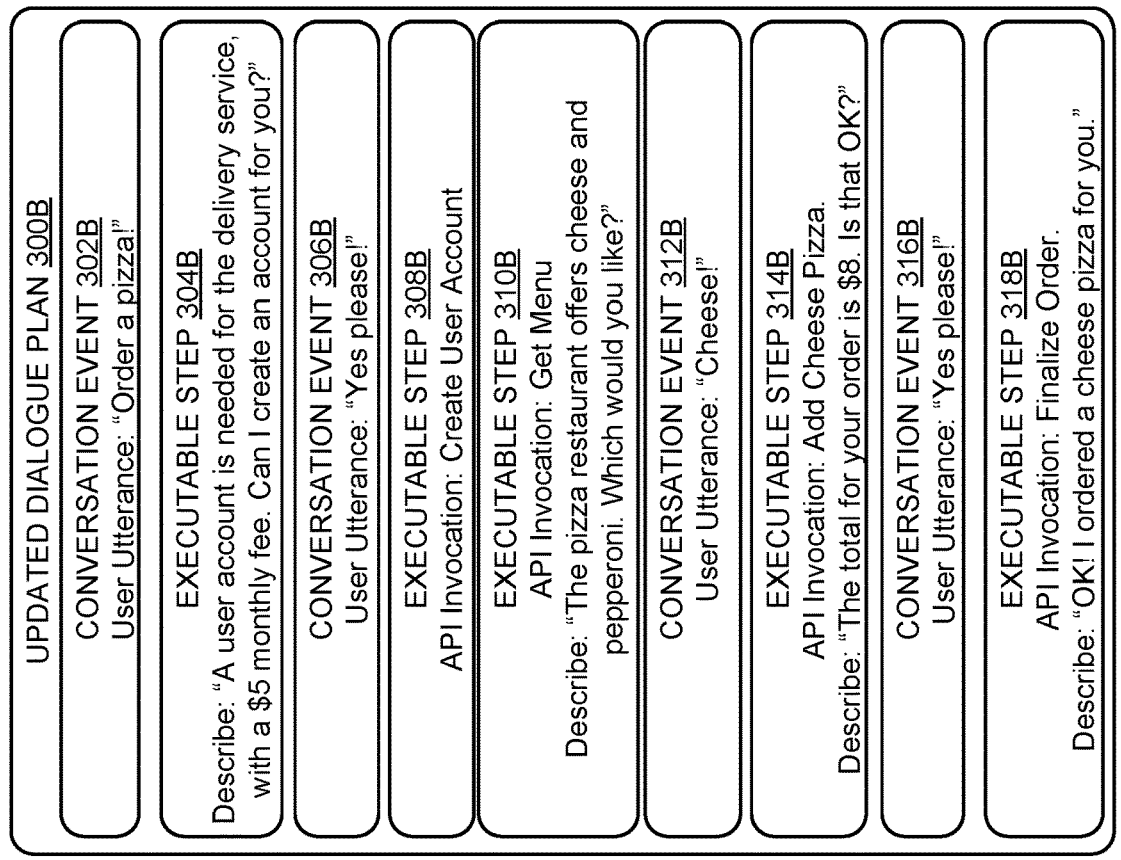
Figure 3B:
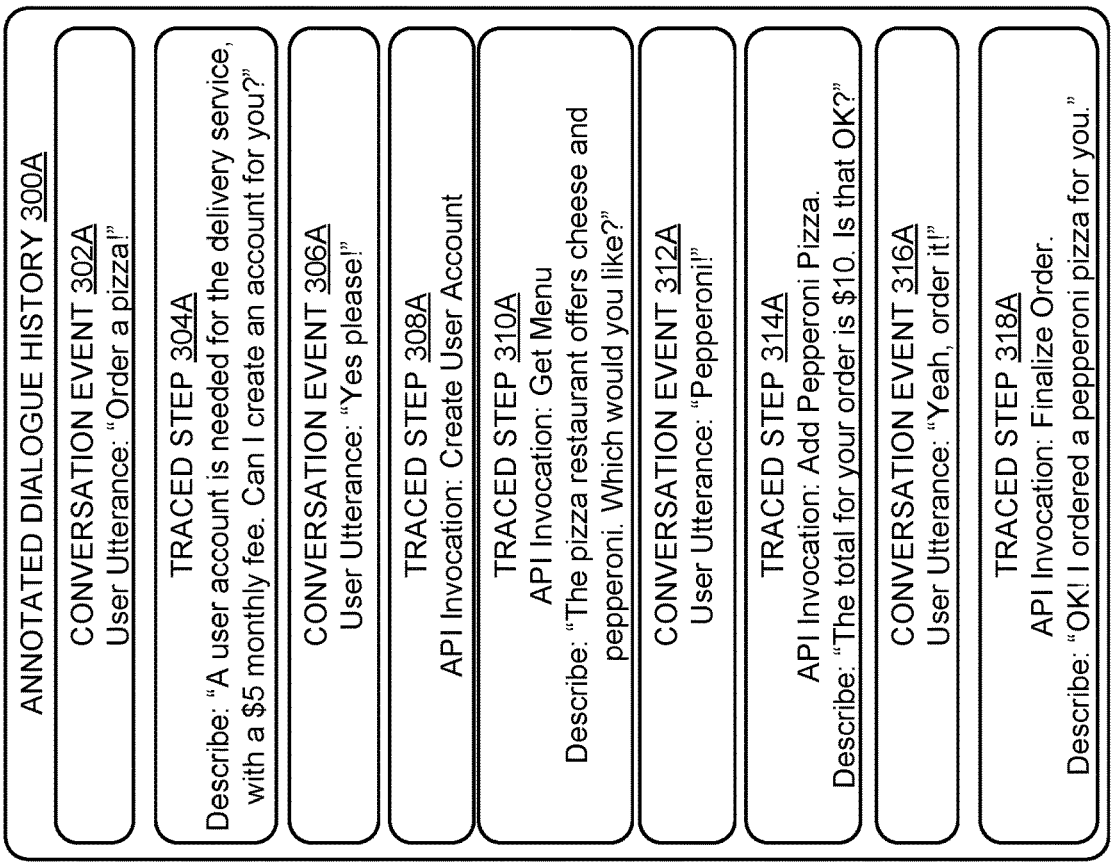

Method 200 comprises, at 202, maintaining an annotated dialogue history of a conversational computing interface. Turning to FIG. 3A, an exemplary annotated dialogue history 300A includes a plurality of conversational events. For example, conversational event 302A is a user utterance in which a user asks to order a pizza. For example, the user utterance may be captured as speech audio, which may be speech-to-text processed locally by the conversational computing interface and/or remotely at a cloud server, as described in more detail with reference to FIG. 4. The annotated dialogue history 300A further includes a plurality of traced steps defining a data-flow for the conversation. The plurality of traced steps indicates the input data, output data, and/or executable computer operations related to each conversational event. In the example annotated dialogue history 300A, traced steps are shown in a simplified descriptive form indicating a high-level description of a computational step taken. However, the examples included herein are non-limiting. Annotated dialogue histories may include traced steps with information at any level of granularity, e.g., including detailed input/output data values and/or types, specific executable code, and the like. For example, traced step 304A is a "describe" operation configured to output a description (e.g., via speech audio and/or text) of an action being taken by the conversational computing interface, namely by informing the user that to order a pepperoni pizza, an account must first be registered with a restaurant-delivery service that has an associated usage fee, and further asking the user for permission to register the account. The "describe" operation is shown with a non-limiting exemplary syntax. Traced steps may be represented using any suitable syntax. FIGS. 3A and 3B are shown with an exemplary syntax that is simplified for ease of understanding, but the represented conversational events and/or traced steps may be represented in computer memory in any suitable manner. A further non-limiting example of syntax for traced steps will be described with regard to FIG. 3C.

Continuing within annotated dialogue history 300A, conversational event 306A is a user utterance in which the user affirmatively grants permission to register the account (e.g., indicating that the monthly account fee is acceptable). Traced step 308A is a context-dependent operation in which the conversational computing interface invokes the restaurant-delivery service API to register the account in the user's name and obtains the login information for the newly registered account. Although not shown in FIG. 3A, the conversational computing interface may be configured to take any suitable steps to register the account for subsequent usage, e.g., providing username, contact information, address, and/or payment information. The overall data-flow of the traced step 308A includes outputting the login information for the newly registered account.

As shown in the annotated dialogue history 300A, the traced step 308A was executed based on the user affirmatively granting permission to register the account. However, traced step 308A may be a context-dependent operation, as it may not be possible and/or desirable to repeat the context-dependent operation of registering the account in the user's name. For example, after the user has already registered the account, the user may not wish to create and/or pay monthly fees for a second account. Nevertheless, output data associated with the traced step is maintained within the annotated dialogue history, as will be described in further detail with regard to FIG. 3C. Accordingly, the maintained output data may be re-used without needing to repeat the context-dependent operation. For example, the login information for the newly registered account that was output by the traced step 308A may be saved and maintained in the annotated dialogue history 300A. Accordingly, the data-flow of the annotated dialogue history 300A may be re-used later, for example to log into the registered account using the saved login information.

Continuing in the annotated dialogue history 300A, traced step 310A is another "describe" operation in which the conversational computing interface informs the user that an account has been opened, states that the restaurant-delivery service API supports ordering from a pizza parlor offering cheese and pepperoni pizza, and requests that the user select one of cheese or pepperoni. Conversational event 312A is a user utterance indicating selection of a pepperoni pizza. Based on the user's request of a pepperoni pizza, traced step 314A is another "describe" operation indicating that the pizza has been added to the current order and may now be purchased. In some examples, adding a pizza to an order may be considered a context dependent operation. Accordingly, in some implementations, the conversational computing interface may be configured not to update an order of the user via the restaurant-delivery service API, but instead to speculatively maintain a separate representation of a potential order. For example, the conversational computing interface may be configured to query the restaurant-delivery service API to determine a price of an item to be added to an order, and to maintain a separate data structure including a current intended order. Accordingly, the conversational computing interface may compute a total price for the order, maintain data indicating options or additional specifications related to the order, etc., so as to update and finalize the order at a later time. Conversational event 316A is a user utterance in which the user affirmatively requests that the pepperoni pizza be ordered. Accordingly, traced step 318A is another invocation of the restaurant-delivery service API, using the registered login credentials of the user to order a pepperoni pizza. As with traced step 308A, traced step 318A may be a context-dependent operation, e.g., based on the associated real-world side effects of invoking an API via a network, incurring a financial cost to pay for the pizza using the user's registered payment information, and ordering the pizza.

Returning to FIG. 2, at 204, method 200 further includes recognizing an updated dialogue plan including a prefix of executable steps and an updated executable step following the prefix. The updated dialogue plan may be an edit of the annotated dialogue history. For example, the edit to the annotated dialogue history may include adding or modifying a step, resulting in an updated dialogue plan including the added or modified step along with the other steps from the annotated dialogue history. As another example, the edit to the annotated dialogue history may include updating one or more steps of the annotated dialogue history from a previous conversational computing interface version to a subsequent conversational computing interface version.

Turning briefly to FIG. 3B, FIG. 3B shows an example of an updated dialogue plan 300B. The updated dialogue plan indicates possible conversational events along with actions that could be executed to respond to those conversational events. As another example, updated dialogue plan 300B may be generated in response to recognizing one or more conversational events corresponding to those in the updated dialogue plan 300B (e.g., the conversational computing interface may be configured to respond to such conversational events by formulating and executing the updated dialogue plan 300B).

Updated dialogue plan 300B includes an updated conversational event 312B in which a user asks for a cheese pizza instead of a pepperoni pizza, and subsequent updated executable steps including updated executable step 314B asking for user confirmation and updated executable step 318B in which the conversational computing interface orders the cheese pizza instead of the pepperoni pizza. Accordingly, updated dialogue plan 300B includes a prefix of executable steps 304B, 308B, and 310B, and an updated executable step 314B. The updated dialogue plan 300B may be derived by automatically and/or manually editing the annotated dialogue history 300A (e.g., creating training data based on varying the contents of annotated dialogue history 300A), e.g., to expand training data of the conversational computing interface. As will be described further below, an updated dialogue plan may be used during training and/or live operation of the conversational computing interface. For example, as will be described in further detail below, an updated dialogue plan may be generated based on adapting a previous annotated dialogue history by adding a new step responsive to a new user utterance (e.g., instead of or in addition to being generated as a direct edit of an annotated dialogue history).

Returning to FIG. 2, at 206, method 200 further includes automatically computer-recognizing that the prefix of executable steps of the updated dialogue plan matches a corresponding prefix of traced steps in the annotated dialogue history.

For example, with reference to FIGS. 3A-3B, the prefix of executable steps 304B, 308B, and 310B of updated dialogue plan 300B in FIG. 3B matches a corresponding prefix of traced steps 304A, 308A, and 310A of annotated dialogue history 300A in FIG. 3A. A conversational computing interface (e.g., conversational computing interface 100 of FIGS. 1A-1D) may be configured to locally and/or remotely (e.g., with the assistance of a cloud server) perform any suitable computational steps to computer-recognize the correspondence. For example, conversational computing interface 100 may recognize the correspondence between prefixes using graph-theoretic, constraint-satisfaction, ML, and/or AI techniques. Conversational computing interface 100 may be configured to attempt to recognize a correspondence between the updated dialogue plan 300B and one or more previous annotated dialogue histories when updated dialogue plan 300B is formulated, for example in response to a new user utterance and/or based on editing annotated dialogue history 300A for use as training data. In some examples, conversational computing interface 100 may be configured to search among a plurality of previous annotated dialogue histories to find a best match for updated dialogue plan 300B. In some examples, as will be described further below with regard to FIG. 3D, one or more annotated dialogue histories and/or updated dialogue plans may be efficiently stored in a common data structure, such as a branching dialogue data structure.

In some examples, automatically computer-recognizing that the prefix of executable steps of the updated dialogue plan matches a corresponding prefix of traced steps in the annotated dialogue history may include aligning a graph corresponding to the annotated dialogue history to a graph corresponding to the updated dialogue plan. For example, the graph corresponding to the annotated dialogue history may be based on a partial ordering of data dependencies between traced steps of the annotated dialogue history. Similarly, the graph corresponding to the updated dialogue plan may be based on a partial ordering of data dependencies between traced steps of the updated dialogue plan. More generally, in some examples, automatically computer-recognizing that the prefix of executable steps of the updated dialogue plan matches the corresponding prefix of traced steps in the annotated dialogue history includes matching data-flow of a step in the annotated dialogue history and a step in the updated dialogue plan. For example, the matching data-flow may include an input or output data value, and/or an input or output data type, associated with both of a traced step and an executable step. As an example, a traced step of the annotated dialogue history that follows the prefix of the annotated dialogue history 300A may depend on data generated by one or more steps of the prefix of the annotated dialogue history 300A and/or data derived from conversation events of the annotated dialogue history 300A. For example, data dependencies of traced step 314A adding the pizza to the current order may include the user's registration information output by traced step 310A as well as the request to order a pepperoni pizza based on the conversational event 302A. Similarly, the updated step 314B of the updated dialogue plan 300B may depend on data generated by one or more conversation events and/or steps of the prefix of the updated dialogue plan 300B, e.g., the registration information that would be output by executable step 310B if executed and the request to order the pepperoni pizza in conversational event 302B.

Although the examples herein feature a simple pizza order with only a small number of steps, the examples are non-limiting and the techniques presented herein may be applied to align annotated dialogue histories and corresponding updated dialogue plans of any suitable level of complexity. In some examples, the matching data-flow may be based on a user intent corresponding to an input or output datum. For example, if a user confirms that an account may be registered with a restaurant-delivery service API as with conversational event 308A, return data of a subsequent traced step 310A may be considered to be a response to the user intent of registering the account. In some examples, data types and/or values returned by the restaurant-delivery service API's account registration functionality may be changed (e.g., as the restaurant-delivery service API is updated to a new version). As such, when executed, executable step 310B may return data that has a distinct data value and/or data type as compared to data returned by traced step 310A. Nevertheless, a conversational computing interface may be configured to recognize that data returned by executable step 310B corresponds to data returned by traced step 310A, due to the data returned by both steps being responsive to the user intent of registering an account with the restaurant-delivery service API. Similarly, downstream consumers of the data-flow from the corresponding steps may be able to use the restaurant-delivery service API registration information irrespective of the change to data value and/or data type, e.g., as traced step 314A and subsequent steps can be completed using the registration information in the format returned by traced step 310A, and executable step 314B and subsequent steps can be completed using the registration information in the format returned by traced step 310B.

Returning to FIG. 2, after determining a correspondence between the prefix of traced steps in the annotated dialogue history and the prefix of executable steps in the updated dialogue plan, at 208, method 200 includes re-using the data-flow from the prefix of traced steps in the annotated dialogue history to automatically determine input data of the updated executable step. For example, the steps of the updated dialogue plan may be executed in substantially the same and/or similar order, resulting in the same or similar data-dependency relationships among steps. In some examples, method 200 may include re-executing at least some of the steps of the updated dialogue plan, for example, to repeat a previous action and/or to generate new annotations for an executable step. For example, if updated dialogue plan 300B is used to order a cheese pizza, the step of adding the pizza to the current order and confirming the order (e.g., updated executable step 314B corresponding to traced step 314A) may be repeated.

However, other steps (e.g., context-dependent operations) of the updated dialogue plan may not be suitable for repetition. For example, if the user has already registered an account with the restaurant-delivery API, it may not be suitable to perform executable steps 308B and/or 310B as there is no need to register a second account and no need to query the user as to whether to register an account (e.g., executable steps 308B and 310B correspond to context-dependent traced steps 308A and 310A). Accordingly, returning briefly to FIG. 2, in some examples, at 208A, re-using the data-flow may include recognizing the context-dependent operation preceding the updated executable step. At 208B, re-using the data-flow may include supplying output data from the context-dependent operation based on the data-flow (e.g., instead of actually executing code of the updated executable step).

FIG. 3C shows a portion of the annotated dialogue 300A of FIG. 3A, showing a non-limiting example syntax for traced steps. For example, traced step 308C indicates potential data-flow for registering an account with a restaurant-delivery API corresponding to the action taken in traced step 308A. Traced step 308C includes executable code configured to communicate with the restaurant-delivery API service and register a user account, and an output variable indicating that the resulting registration info can be accessed as the variable "r5." Traced step 310C includes executable code parametrized by inputting the variable "r5." The executable code is configured to communicate with the restaurant-delivery API service, providing an input value indicating the registered user account stored in the variable "r5." The executable code is configured to obtain a menu of available food items for delivery via the API, and to store the menu information as the variable "r6." Traced step 310C further includes executable code configured to describe the menu information that was obtained, e.g., by outputting speech audio listing the available types of pizza as shown in traced step 310A.

In some examples, supplying output data from the context-dependent operation based on the data-flow may include re-using output data recorded from the previous execution, e.g., the output data from the context-dependent operation may be based on previously-recorded output data in the annotated dialogue history. For example, the executable step 310B in FIG. 3B and corresponding executable code may not actually be executed when executing the updated dialogue plan. Instead, the previously-returned registration information for the new account that was stored into variable "r5" as indicated in FIG. 3C can be re-used and returned from executable step 310B, without actually registering a further new account.

Re-using data-flow of previous steps may permit the efficient execution of an updated dialogue plan, and/or re-annotation of an updated dialogue plan for later use as training data. By avoiding the repetition of context-dependent steps, the methodology of the present disclosure intelligently avoids incurring unnecessary computational and/or other expenses, and enables the execution of an updated dialogue plan even when it may not be possible to actually execute every step specified in the updated dialogue plan. For example, if the user orders a pepperoni pizza on a first night (e.g., by causing the conversational computing interface to execute the steps of annotated dialogue history 300A), and then orders a cheese pizza on a subsequent night (e.g., causing the conversational computing interface to execute an updated dialogue plan 300B), then steps of updated dialogue plan 300B may be executed in a similar order to substantially replicate data-flow of annotated dialogue history 300A. However, updated executable step 310B may be skipped so as to avoid redundantly registering a second user account with the restaurant-service API. Instead, data-flow of annotated dialogue history 300A may be re-used directly by utilizing the registration information already returned by traced step 310A instead of actually executing executable step 310B.

Method 200 may be used for re-generating annotation data (e.g., for a new system version or to cover more scenarios not present yet in training data), and/or re-executing previous dialogues (e.g., for repeating a previous action or responding to an updated user request).

For example, generating annotation data for training may be used for adapting the annotated dialogue by changing one or more conversational events and/or actions so as to cover more scenarios, e.g., changing the user's request for a pepperoni pizza to a request for a cheese pizza as described above. In other examples, generating annotation data for training may be used for adapting the annotated dialogue from a previous system version to a subsequent, different system version. For example, the annotated dialogue history may be a training example dialogue for a previous system version of the conversational computing interface. Accordingly, the updated dialogue plan may be an automatic update of the annotated dialogue history to a subsequent, different system version. As an example, a restaurant-delivery service API may be updated such that its previous functionality is supported via an updated interface (e.g., different function names). Accordingly, an annotated dialogue history may be automatically updated to a new system version by replacing old function names in API invocations in the annotated dialogue history, with corresponding updated function names in the updated dialogue plan. For example, with reference to FIG. 3C, the restaurant-delivery service API function call "getPizzaMenu" may be updated to a new restaurant-delivery service API function call "getMenu(options: pizza)". In either case, to generate more annotated data for training, an updated executable step may be automatically updated with a traced step defining a data-flow for the updated executable step, e.g., based on re-executing the updated executable step (e.g., if the step is a context-independent executable step) and/or based on re-using data-flow from the annotated dialogue history (e.g., if the step is a context-dependent executable step). In some examples, the annotated dialogue history is one of a plurality of annotated dialogue histories in a training set. Accordingly, the methodology of the present disclosure may be utilized to automatically update the plurality of annotated dialogue histories from the previous system version to the subsequent system version, e.g., by re-generating data-flow for an updated dialogue plan corresponding to each annotated dialogue history by executing the context-independent steps of the updated dialogue plan and supplying output data for context-dependent steps of the updated dialogue plan based on the previous data-flow.

In other examples, an annotated dialogue history represents an ongoing conversation with a user, and an updated dialogue plan is generated in response to a new user conversation event (e.g., a new utterance by the user). For example, the method of the present disclosure may be performed repeatedly to respond to a plurality of different user utterances. For example, responding to each user utterance may include recognizing an additional updated executable step based on the user utterance, and re-using a previously recorded data-flow to supply input data to the additional updated executable step.

For example, the updated dialogue plan may be generated based on automatically computer-recognizing a user intent of the new utterance, and automatically generating the updated executable step responsive to the user intent of the new utterance. As an example, if a user asks to order a pizza, the conversational computing interface may set up a user account for ordering pizza via a restaurant-delivery service API and present the options of cheese or pepperoni as described above. If the user asks for a pepperoni pizza, the conversational computing interface may add it to a current order and ask the user to confirm the order, stipulating the price as described above. Based on being asked for such confirmation, the user may instead decide to change the order to a cheese pizza instead. Accordingly, the user may say, "Actually, make it a cheese pizza." Based on such user utterance, the conversational computing system may be configured to re-use the annotated dialogue history so far in the form of an updated executable plan, with a subsequent step of replacing the pepperoni pizza in the order with a cheese pizza and ordering the cheese pizza. Accordingly, previous data from the annotated dialogue history executed so far (e.g., registration information for the restaurant-delivery service API) may be re-used in the updated executable plan (e.g., so that the conversational computing interface may automatically complete the cheese pizza order without needing to re-configure the user account).

In some examples, one or more steps of an updated executable plan may be performed speculatively so as to efficiently reply to a user request in a conversation. For example, in the above-described example of ordering a pizza, the conversational computing interface may predict that the user likely wishes to order a cheese pizza before the user actually answers with a preference of pizza topping. For example, the conversational computing interface may make such a prediction based on user-specific data (e.g., based on one or more prior orders of the user) and/or based on user-agnostic data (e.g., based on a popular order among users of the restaurant-delivery service). Accordingly, the conversational computing interface may pre-emptively speculate that a cheese pizza should be added to the current order. Then, after the user does indicate a preference for cheese pizza, the current order will be fully prepared already, enabling the conversational computing interface to complete the order with minimal latency (e.g., as compared to waiting for the user to answer before invoking a networked restaurant-delivery service API and waiting on a network latency to confirm that a cheese pizza has been added to the current order). It will be appreciated that such speculative execution of one or more predicted steps in an updated executable plan may be implemented analogously to branch prediction in a computer processing unit, e.g., context-independent steps may be freely executed in a pre-emptive fashion and rolled back if contradicted by results of not-yet-executed steps and/or conversational events.

As another example, the conversational computing interface may be configured to predict a user's intended request while parsing recognized speech by the user. In some examples, the conversational computing interface may begin executing one or more actions as soon as speech is recognized (e.g., even before the user stops speaking). For example, if the user says, "get me a cheese . . . " the conversational computing assistant may pre-emptively add a cheese pizza to an order for a restaurant delivery service. If the user continues, " . . . pizza," then accordingly, the conversational computing interface may execute a context-dependent action of finalizing the order with the restaurant delivery service. However, if the user instead continues, " . . . -making book" then the conversational computing interface may be configured to recognize that it has mis-predicted the user's intent (e.g., because the user does not in fact want to order a pizza, but instead wishes to order a book about cheese-making). By pre-emptively adding a cheese pizza to an order with a restaurant-delivery service API, the conversational computing interface may reduce a latency to complete the order if the user does say they want a cheese pizza. Nevertheless, the conversational computing interface may delay context-independent actions (e.g. finalizing the order) until it is relatively certain that the user's intent has been understood correctly (e.g., after the user specifically says "cheese pizza," and/or after explicitly confirming the user's intent by prompting the user with a question). In other words, the conversational computing interface may pre-emptively execute context-independent actions (e.g., such as adding an item to an order without finalizing the order), while not executing context-dependent actions until a determination is made that the user wishes to perform such context-dependent actions.

In another example, an initial determined user intent may be incorrect, for example, due to incorrect speech-to-text translation. For example, if a user says, "I would like to order a pepper pizza," such utterance may initially be incorrectly parsed as "I would like to order a pepperoni pizza." Accordingly, the conversational computing assistant may pre-emptively add a pepperoni pizza to the order. If the user continues, " . . . I think red hot, not sweet," then the conversational computing assistant may infer that the user did not actually mention "pepperoni" but in fact mentioned "pepper," as in "red hot chili pepper." Accordingly, the conversational computing assistant is configured to pre-emptively add a pepperoni pizza to an active order (e.g., to save time), but to not execute the context-dependent action of finalizing an order until after confirming whether the user wants a pepperoni pizza. After hearing the subsequent user utterance, the conversational computing assistant may infer that a "red hot pepper pizza" was actually desired by the user. Accordingly, the conversational computing assistant may be configured to automatically perform additional context-independent actions of updating the order and confirming the order with the user (e.g., by saying "I can order you a pizza with red hot peppers. OK?"), before performing a context-independent action of finalizing the order.

In the example shown in FIGS. 3A-3B, the registration information of the restaurant-delivery service API may be re-used in the data-flow corresponding to executable step 310B, exactly as it was returned in traced step 310A. However, in other examples, verbatim re-use of previous data-flow may not be appropriate or possible. For example, in some examples, updated dialogue plan 300B may be an updated dialogue plan being executed to generate annotation data for training purposes (e.g., to expand a set of exemplary annotated dialogues of the conversational computing interface). For example, updated dialogue plan 300B may not have been generated in response to a conversation with a user in which the user asked to order a cheese pizza. Instead, updated dialogue plan 300B may be a training example generated automatically based on annotated dialogue history 300A, e.g., by replacing the word "pepperoni" with the word "cheese." Accordingly, updated dialogue plan 300B may be executed so as to assess how the conversational computing interface responds to a conversational event in which the user asks for a cheese pizza instead of a pepperoni pizza, so as to evaluate such response and/or provide training data for training the system to better handle different kinds of pizza orders in the future.

As such, if updated dialogue plan 300B is executed for the purposes of training, it may not be suitable to actually utilize registration information of a particular user that would be returned by executable step 310B. Similarly, it may not be suitable to actually attempt to add a cheese pizza to a current order or to finalize the order as indicated by executable steps 314B and 318B. For example, for training purposes it may be more suitable to execute a "mock" API of the restaurant-delivery service API configured to return falsified registration and/or order confirmation information, so as to avoid actually ordering pizzas during the process of machine learning training. Accordingly, in some examples, supplying output data from the context-dependent operation based on the data-flow may include supplying generated data having a data type matching the output data recorded from the previous execution. For example, with reference to FIGS. 3A-3C, when executing updated dialogue plan 300B for the purposes of training, instead of actually invoking executable code and/or using an actual restaurant-delivery service API registration in output variable, the conversational computing interface may be configured to synthesize mock registration information having the same datatype as the output variable, e.g., to save such mock registration information into "r5." For example, the mock registration information may have the same data fields as real registration information, albeit populated with fabricated user data. Similarly, instead of actually invoking executable code, the conversational computing interface may be configured to return a mock restaurant menu as an output variable having a suitable datatype for restaurant menus. For example, instead of actually utilizing the mock registration information provided as input to the executable code, the conversational computing interface may be configured to return a mock menu that contains "cheese pizza," and "pepperoni pizza," irrespective of selections that may currently be offered by an actual restaurant-delivery service API. For example, to generate annotated training data showing how the system would behave while ordering a cheese pizza (e.g., what descriptions the system would output), the data from the mock API may be configured to have a data type matching the output data recorded in a previous execution of the real restaurant-delivery service API. Generation of input and/or output data based on matching data types may be used during training when data from a previous execution is unsuitable for any reason, e.g., because such data is outdated, private to a user, and/or associated with an API that cannot or should not be invoked directly during training.

In some examples, an API may be changed between a first execution recorded in an annotated dialogue history and a subsequent execution of an updated dialogue plan corresponding to the annotated dialogue history, resulting in a mismatch between data-flow of corresponding steps in the annotated dialogue history and the updated dialogue plan. For example, a weather-reporting API may provide a "current weather" function. In a first execution recorded in an annotated dialogue history, the "current weather" function may have returned a current temperature, in degrees Fahrenheit, as an integer value. For example, the user may ask "What is the current weather?" and accordingly, the conversational computing interface may perform the steps of retrieving the current temperature in Fahrenheit from the API's "current weather" function, and outputting the current temperature. If the user then asks, "what is that in Celsius?" the conversational computing interface may perform additional steps of calculating the converted temperature in Celsius and outputting the converted temperature. Later, the weather API may be changed so that the "current weather" function returns an amount of rainfall instead of a current temperature. As such, it may be desirable to generate new training data based on utilizing the new version of the weather API. Accordingly, the conversational computing interface may re-execute an updated dialogue plan based on the steps of the annotated dialogue history, e.g., including invoking the "current weather" function and then responding to a user request to convert the result to Celsius. However, if the new version of the "current weather" function returns an amount of rainfall, it would not make sense to convert such result to Celsius. As such, the request "what is that in Celsius?" would be missing input data. Based on the change to the weather API, it may not be possible to directly obtain input data of the right type (e.g., the weather API may no longer support returning a temperature, or returning a temperature may be supported by a different function that is not utilized in the updated dialogue plan). In other words, obtaining the current temperature may have been a context-dependent operation that may not be readily repeated.

As such, although the updated dialogue plan may be executed with similar data-flow to the annotated dialogue history, after actually invoking the "current weather" function a mismatch may occur in which suitable input data is not available for a subsequent step. In some examples, the conversational computing interface may be configured to handle such mismatch by reporting an error result, e.g., supplying output data from the context-dependent operation may include supplying an error value indicating a missing input data value. For example, since it does not make sense to convert an amount of rainfall into a temperature in Celsius, the updated dialogue plan may be configured to execute up until the weather API returns the rainfall value, and then to supply an error value to the subsequent step attempting to convert a temperature from Fahrenheit to Celsius. For example, the use of an error value may permit partial execution/annotation of an updated dialogue plan. In some examples, a conversational computing interface may be trained to handle erroneous situations (e.g., by asking a user or a human annotator to provide clarification or feedback, and/or by generating a different updated dialogue plan). Accordingly, even though the updated dialogue plan may not be fully executed based on the occurrence of the error value, the data-flow of the annotated dialogue history may nevertheless be leveraged for training of the conversational computing system.

In other examples, it may be desirable to train and/or test subsequent portions of the updated dialogue plan, even when a mismatch prevents the fully coherent execution of the updated dialogue plan. For example, it may be desirable to ensure that the Fahrenheit to Celsius conversion function still works in an updated version of a conversational computing interface, even if the updated invocation of the "current weather" function of the weather API no longer returns a temperature value. Accordingly, in some examples the conversational computing interface may be configured to "hallucinate" (e.g., automatically generate) a synthetic input value for an updated executable step. For example, the conversational computing interface may be configured to generate a value automatically based on a datatype for the value, e.g., to generate a Fahrenheit temperature of 60 degrees whenever a Fahrenheit temperature value is needed but not available in the existing data-flow.

In some examples, annotated dialogue histories and/or updated executable plans may be implemented as branching dialogues in which each conversational event and/or conversational computing interface step may be followed by one or more different alternative conversational events and/or conversational computing interface steps, e.g., indicating different counterfactual possibilities in the dialogue history and/or updated executable plan. Accordingly, a prefix of one or more conversational event(s) may be stored along with multiple different suffixes within the same data structure, e.g., in a tree and/or graph data structure. For example, FIG. 3D shows an exemplary tree data structure including a prefix 300D of conversational events and conversational computing interface steps common to the annotated dialogue history 300A of FIG. 3A and the updated dialogue plan 300B of FIG. 3B, along with two different suffixes (namely, original suffix 350D and updated suffix 352D) indicating the differences between the annotated dialogue history and the updated dialogue plan 300B. In other words, conversation events 302B and 306B may be efficiently stored by reference to the corresponding conversation events 302A and 306A, and similarly updated executable steps 304B, 308B, and 310B may be stored efficiently by reference to the corresponding traced steps 304A, 308B, and 310B, while subsequent steps can be stored separately to indicate different alternative dialogues.

Multiple different annotated dialogue histories and/or updated dialogue plans (referred to generally as dialogues) may be stored efficiently in a branching dialogue data structure. For example, two different dialogues may start with the same prefix indicating the same interaction between a user and a conversational computing interface, but the dialogues may diverge with different suffixes based on different reactions from the user and/or different real-world context. Although training conversational interfaces may benefit from a large number of different dialogues, accessing and maintaining many different dialogues may present a burden on computer storage, data maintenance costs, and/or computer processor utilization. In some examples, annotated dialogues may be stored in a normalized format, for example as an efficient bytecode sequence and/or as a branching dialogue including a tree/graph data structure. Accordingly, when such branching dialogues are used, creating an update dialogue plan with an updated executable step may be implemented efficiently as a merge/re-base operation on the branching dialogue (e.g., analogous to a merge/re-base operation on directed acyclic graph structures, tree structures, and/or revision control system data structures). For example, the merge/rebase may include splicing one or more different suffixes after a shared prefix. Accordingly the new merged/re-based branching dialogue may be efficiently re-executed using the method of the present disclosure.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 4:
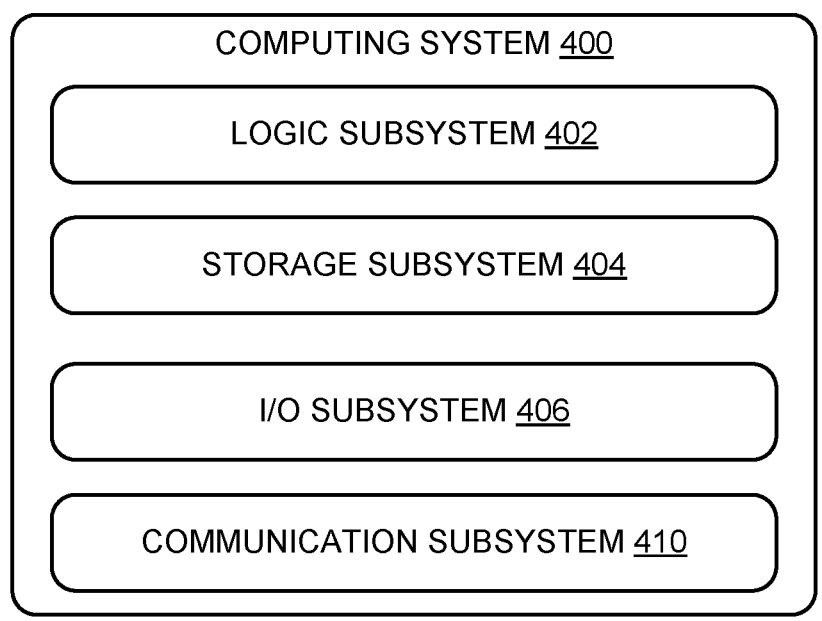
FIG. 4 shows a computing system.

FIG. 4 schematically shows a simplified representation of a computing system 400 configured to provide any to all of the compute functionality described herein. Computing system 400 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, home appliances, and/or other computing devices. For example, computer system 400 may instantiate a conversational computing interface, such as conversational computing interface 100 of FIGS. 1A-1D.

Computing system 400 includes a logic subsystem 402 and a storage subsystem 404. Computing system 400 may optionally include an input/output subsystem 406, communication subsystem 408, and/or other subsystems not shown in FIG. 4. Components of computing system 400 may be implemented as a local computer system (e.g., within a common enclosure) and/or as a computing system of one or more networked, remote computers (e.g., cloud computing).

Whether implemented as a local computer system and/or a computing system of one or more networked, remote computers, computing system 400 may be configured to store conversational events and/or traced steps in an annotated dialogue history. For example, computing system 400 may maintain the annotated dialogue history on storage device 402. Computing system 400 is further configured to execute code to analyze and respond to conversational events. For example, storage device 402 may hold instructions configured to perform speech-to-text translation of user utterance audio into computer-readable text. Storage device 402 may further hold instructions configured to generate executable code for one or more planned actions responsive to the conversational events (e.g., responsive to the translated computer-readable text). For example, storage device

402 may include a code generator machine configured to generate the executable code. In some examples, the code generator machine may be implemented using state of the art and/or future ML and/or AL technologies, e.g., using a previously-trained machine learning system that is trained with annotated dialogue history data indicating exemplary conversational events (e.g., user utterance text) and for each exemplary conversational event, an exemplary conversational computing interface response action including exemplary executable code.

Logic subsystem 402 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 404 includes one or more physical devices configured to hold computer information temporarily and/or permanently such as data and instructions executable by the logic subsystem. When the storage subsystem includes two or more devices, the devices may be collocated and/or remotely located. Storage subsystem 404 may include volatile, nonvolatile, dynamic, static, read/write, read-only, random-access, sequential-access, location-addressable, file-addressable, and/or content-addressable devices. Storage subsystem 404 may include removable and/or built-in devices. When the logic subsystem executes instructions, the state of storage subsystem 404 may be transformed—e.g., to hold different data.

Aspects of logic subsystem 402 and storage subsystem 404 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, input/output subsystem 406 may include one or more display devices utilizing virtually any type of technology. In some implementations, display subsystem may include one or more virtual-, augmented-, or mixed reality displays. which may be used to present a visual representation of data held by storage subsystem 404. This visual representation may take the form of a GUI. Alternately or additionally, input/output subsystem 406 may include a speaker, which may be used to output an audible representation of data held by storage subsystem 404, for example, via speech output.

When included, input subsystem 406 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 408 may be configured to communicatively couple computing system 400 with one or more other computing devices. Communication subsystem 400 may include wired and/or wireless communication devices compatible with one or more different communication protocols. The communication subsystem may be configured for communication via personal-, local- and/or wide-area networks.

Machines may be implemented using any suitable combination of state-of-the-art and/or ML, AI, and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). For example, an annotated dialogue may be used as labelled training data (e.g., for supervised training to predict a suitable annotation given an event). For example, for an annotated dialogue including an event and an annotation indicating a response to that event, the training data features may be defined based on the event and the training data label may be defined based on the annotation. Simultaneously training the plurality of methods, processes, and/or components may improve such collective functioning. In some examples, one or more methods, processes, and/or components may be trained independently of other components (e.g., offline training on historical data).

In some examples, a conversational computing interface may be used to implement an automated assistant, which is configured to assist users via natural language interactions. Automated assistants are one non-limiting example of conversational computing interfaces, and conversational computing interfaces may be implemented according to the present disclosure for any suitable purpose, for example, to permit a user to use natural language to interact with any suitable computer hardware and/or computer software. Conversational computing interfaces such as automated assistants may be referred to by other names, for example as intelligent assistants or automated agents. As such, every reference to an automated assistant, intelligent assistant, and/or automated agent applies equally to any other conversational computer interface or other computing framework configured to respond to speech or text input.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method of leveraging a dialogue history of a conversational computing interface to execute an updated dialogue plan comprises: maintaining an annotated dialogue history of the conversational computing interface, the annotated dialogue history including a plurality of traced steps defining a data-flow including input data used to execute a context-dependent operation and output data recorded from a previous execution of the context-dependent operation; recognizing an updated dialogue plan including a prefix of executable steps and an updated executable step following the prefix; automatically computer-recognizing that the prefix of executable steps of the updated dialogue plan matches a corresponding prefix of traced steps in the annotated dialogue history; and re-using the data-flow from the prefix of traced steps in the annotated dialogue history to automatically determine input data of the updated executable step, including recognizing the context-dependent operation preceding the updated executable step, and supplying output data from the context-dependent operation based on the data-flow. In this or any other example, supplying output data from the context-dependent operation based on the data-flow includes re-using output data recorded from the previous execution. In this or any other example, supplying output data from the context-dependent operation based on the data-flow includes supplying generated data having a data type matching the output data recorded from the previous execution. In this or any other example, wherein supplying output data from the context-dependent operation based on the data-flow includes supplying an error value indicating a missing input data value. In this or any other example, wherein the updated dialogue plan is an edit of the annotated dialogue history, the method further comprising automatically annotating the updated executable step with a traced step defining a data-flow for the updated executable step. In this or any other example, wherein the annotated dialogue history is a training example dialogue for a previous system version of the conversational computing interface, and the updated dialogue plan is an automatic update of the annotated dialogue history to a subsequent, different system version. In this or any other example, the annotated dialogue history is one of a plurality of annotated dialogue histories in a training set, the method further comprising automatically updating the plurality of annotated dialogue histories from the previous system version to the subsequent system version. In this or any other example, the annotated dialogue history represents a conversation with a user, and the updated dialogue plan is generated responsive to a new utterance by the user, including automatically computer-recognizing a user intent of the new utterance, and automatically generating the updated executable step responsive to the user intent of the new utterance. In this or any other example, the method further comprises responding to a plurality of different user utterances, wherein responding to each user utterance includes recognizing an additional updated executable step, and re-using a previously recorded data-flow to supply input data to the additional updated executable step. In this or any other example, the context-dependent operation includes a computer operation causing one of a pre-defined plurality of non-repeatable side-effects. In this or any other example, the context-dependent operation includes a computer operation that depends on input data that is variably unobtainable depending on context. In this or any other example, the context-dependent operation includes a computer operation having a computational expense exceeding a predefined threshold. In this or any other example, automatically computer-recognizing that the prefix of executable steps of the updated dialogue plan matches the corresponding prefix of traced steps in the annotated dialogue history includes aligning a first graph corresponding to the annotated dialogue history to a second graph corresponding to the updated dialogue plan. In this or any other example, the graph corresponding to the annotated dialogue history is based on a partial ordering of data dependencies between traced steps of the annotated dialogue history. In this or any other example, automatically computer-recognizing that the prefix of executable steps of the updated dialogue plan matches the corresponding prefix of traced steps in the annotated dialogue history includes matching data-flow of a step in the annotated dialogue history and a corresponding step in the updated dialogue plan. In this or any other example, the matching data-flow includes an input or output data value. In this or any other example, the matching data-flow includes an input or output data type. In this or any other example, the matching data-flow includes a user intent corresponding to an input or output datum.

In an example, a method of updating training data of a conversational computing interface comprises: maintaining a training set including a plurality of different training example dialogues of the conversational computing interface, wherein each training example dialogue of the plurality of different training example dialogues includes a plurality of traced steps defining a data-flow including input data used to execute a context-dependent operation and output data recorded from a previous execution of the context-dependent operation; for each training example dialogue of the plurality of different training example dialogues: recognizing an updated dialogue plan based on an update of the training example dialogue from a previous system version to a subsequent system version, wherein the updated dialogue plan includes a prefix of executable steps matching a corresponding prefix of traced steps in the training example dialogue and an updated executable step following the prefix; and automatically annotating the updated executable step with an updated traced step defining a data-flow for the updated executable step that re-uses the data-flow from the prefix of traced steps in the training example dialogue to automatically determine input data of the updated executable step, including recognizing the context-dependent operation preceding the updated executable step, and supplying output data from the context-dependent operation based on the data-flow.

In an example, a method of re-executing a dialogue plan of a conversational computing interface to respond to an utterance comprises: maintaining an annotated dialogue history of the conversational computing interface, the annotated dialogue history including a plurality of traced steps defining a data-flow including input data used to execute a context-dependent operation and output data recorded from a previous execution of the context-dependent operation; responsive to receiving a user utterance, automatically computer-recognizing a user intent of the user utterance; automatically generating an updated dialogue plan including an updated executable step based on the user intent of the user utterance; automatically computer-recognizing that a prefix of executable steps of the updated dialogue plan matches a corresponding prefix of traced steps in the annotated dialogue history; and re-using the data-flow from the prefix of traced steps in the annotated dialogue history to automatically determine input data of the updated executable step, including recognizing the context-dependent operation preceding the updated executable step, and supplying output data from the context-dependent operation based on the data-flow.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of leveraging a dialogue history of a conversational computing interface to execute an updated dialogue plan, the method comprising:

maintaining an annotated dialogue history of the conversational computing interface, the annotated dialogue history including an ordered sequence of a plurality of traced steps and conversation events defining a data-flow, each data-flow including input data used to execute a context-dependent operation and output data recorded from a previous execution of the context-dependent operation;

recognizing an updated dialogue plan including A) a prefix of executable steps matching a subset of the plurality of traced steps including the context-dependent operation, and B) a suffix of executable steps following the prefix of executable steps, the suffix of executable steps including at least an updated executable step following the prefix so that the suffix of executable steps varies from an original suffix of the plurality of traced steps;

automatically computer-recognizing that the prefix of executable steps of the updated dialogue plan matches the corresponding subset of the plurality of traced steps in the annotated dialogue history; and re-using the data-flow from the prefix of traced steps in the annotated dialogue history to automatically supply output data from the context-dependent operation as input data for the updated executable step.

2. The method of claim 1, wherein supplying output data from the context-dependent operation based on the data-flow includes re-using output data recorded from the previous execution.

3. The method of claim 1, wherein supplying output data from the context-dependent operation based on the data-flow includes supplying generated data having a data type matching the output data recorded from the previous execution.

4. The method of claim 1, wherein supplying output data from the context-dependent operation based on the data-flow includes supplying an error value indicating a missing input data value.

5. The method of claim 1, wherein the updated dialogue plan is an edit of the annotated dialogue history, the method further comprising automatically annotating the updated executable step with a traced step defining a data-flow for the updated executable step.

6. The method of claim 1, wherein the annotated dialogue history is a training example dialogue for a previous system version of the conversational computing interface, and the updated dialogue plan is an automatic update of the annotated dialogue history to a subsequent, different system version.

7. The method of claim 6, wherein the annotated dialogue history is one of a plurality of annotated dialogue histories in a training set, the method further comprising automatically updating the plurality of annotated dialogue histories from the previous system version to the subsequent system version.

8. The method of claim 1, wherein the annotated dialogue history represents a conversation with a user, and the updated dialogue plan is generated responsive to a new utterance by the user, including automatically computer-recognizing a user intent of the new utterance, and automatically generating the updated executable step responsive to the user intent of the new utterance.

9. The method of claim 8, further comprising responding to a plurality of different user utterances, wherein responding to each user utterance includes recognizing an additional updated executable step, and re-using a previously recorded data-flow to supply input data to the additional updated executable step.

10. The method of claim 1, wherein the context-dependent operation includes a computer operation causing one of a pre-defined plurality of non-repeatable side-effects.

11. The method of claim 1, wherein the context-dependent operation includes a computer operation that depends on input data that is variably unobtainable depending on context.

12. The method of claim 1, wherein the context-dependent operation includes a computer operation having a computational expense exceeding a predefined threshold.

13. The method of claim 1, wherein automatically computer-recognizing that the prefix of executable steps of the updated dialogue plan matches the corresponding prefix of traced steps in the annotated dialogue history includes aligning a first graph corresponding to the annotated dialogue history to a second graph corresponding to the updated dialogue plan.

14. The method of claim 13, wherein the graph corresponding to the annotated dialogue history is based on a partial ordering of data dependencies between traced steps of the annotated dialogue history.

15. The method of claim 1, wherein automatically computer-recognizing that the prefix of executable steps of the updated dialogue plan matches the corresponding prefix of traced steps in the annotated dialogue history includes matching data-flow of a step in the annotated dialogue history and a corresponding step in the updated dialogue plan, and wherein the updated dialogue plan is saved as a branching dialogue including the updated executable step branching from an already-saved subset of the plurality of traced steps.

16. The method of claim 15, wherein the matching data-flow includes an input or output data value.

17. The method of claim 15, wherein the matching data-flow includes an input or output data type.

18. The method of claim 15, wherein the matching data-flow includes a user intent corresponding to an input or output datum.

19. A method of updating training data of a conversational computing interface, the method comprising:
maintaining a training set including a plurality of different training example dialogues of the conversational computing interface, wherein each training example dialogue of the plurality of different training example dialogues includes an ordered sequence of a plurality of traced steps and conversation events defining a data-flow, each data flow including input data used to execute a context-dependent operation and output data recorded from a previous execution of the context-dependent operation;
for each training example dialogue of the plurality of different training example dialogues:
recognizing an updated dialogue plan based on an update of the training example dialogue from a previous system version to a subsequent system version, wherein the updated dialogue plan includes A) a prefix of executable steps matching a subset of the plurality of traced steps including the context-dependent operation in the training example dialogue and, B) a suffix of executable steps following the prefix of executable steps, the suffix of executable steps including at least an updated executable step following the prefix so that the suffix of executable steps varies from an original suffix of the plurality of traced steps; and
automatically annotating the updated executable step with an updated traced step defining a data-flow for the updated executable step that re-uses the data-flow from the prefix of traced steps in the training example dialogue to automatically supply output data from the context-dependent operation as input data for the updated executable step.

20. A method of re-executing a dialogue plan of a conversational computing interface to respond to an utterance, the method comprising:
maintaining an annotated dialogue history of the conversational computing interface, the annotated dialogue history including an ordered sequence of a plurality of traced steps and conversation events defining a data-flow, each data-flow including input data used to execute a context-dependent operation and output data recorded from a previous execution of the context-dependent operation;
responsive to receiving a user utterance, automatically computer-recognizing a user intent of the user utterance;
automatically generating an updated dialogue plan including A) a prefix of executable steps matching a subset of the plurality of traced steps including the context-dependent operation, and B) a suffix of executable steps following the prefix of executable steps, the suffix of executable steps including at least an updated executable step based on the user intent of the user utterance, the updated executable step following the prefix so that the suffix of executable steps varies from an original suffix of the plurality of traced steps;
automatically computer-recognizing that the prefix of executable steps of the updated dialogue plan matches the corresponding subset of the plurality of traced steps in the annotated dialogue history; and
re-using the data-flow from the prefix of traced steps in the annotated dialogue history to automatically supply output data from the context-dependent operation as input data for the updated executable step.

* * * * *